US006549997B2

United States Patent
Kalyanasundharam

(10) Patent No.: US 6,549,997 B2
(45) Date of Patent: Apr. 15, 2003

(54) DYNAMIC VARIABLE PAGE SIZE TRANSLATION OF ADDRESSES

(75) Inventor: Vydhyanathan Kalyanasundharam, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 140 days.

(21) Appl. No.: 09/810,816

(22) Filed: Mar. 16, 2001

(65) Prior Publication Data

US 2002/0133685 A1 Sep. 19, 2002

(51) Int. Cl.[7] .............................................. G06F 12/10
(52) U.S. Cl. ...................................................... 711/207
(58) Field of Search ......................................... 711/207

(56) References Cited

U.S. PATENT DOCUMENTS

| | | | | |
|---|---|---|---|---|
| 5,263,140 A | * | 11/1993 | Riordan ........................ 711/200 |
| 5,319,590 A | * | 6/1994 | Montoye ................. 365/189.01 |
| 5,375,214 A | * | 12/1994 | Mirza et al. .................. 711/207 |
| 5,446,854 A | * | 8/1995 | Khalidi et al. .................... 711/1 |
| 5,465,337 A | * | 11/1995 | Kong ............................ 711/206 |
| 5,475,827 A | * | 12/1995 | Lee et al. ..................... 711/207 |
| 5,479,627 A | * | 12/1995 | Khalidi et al. ............... 711/205 |
| 5,526,504 A | * | 6/1996 | Hsu et al. ..................... 711/207 |
| 5,535,351 A | * | 7/1996 | Peng ............................. 365/49 |
| 5,617,554 A | * | 4/1997 | Alpert et al. ................. 711/208 |
| 5,706,461 A | * | 1/1998 | Branstad et al. ............. 711/200 |
| 5,712,998 A | * | 1/1998 | Rosen .......................... 711/200 |
| 5,717,885 A | * | 2/1998 | Kumar et al. ................. 711/207 |
| 5,765,209 A | * | 6/1998 | Yetter .......................... 711/200 |
| 5,796,978 A | * | 8/1998 | Yoshioka et al. ............ 711/206 |
| 5,802,605 A | * | 9/1998 | Alpert et al. ................. 711/208 |
| 5,907,867 A | * | 5/1999 | Shinbo et al. ............... 711/207 |
| 5,956,756 A | * | 9/1999 | Khalidi et al. ............... 711/207 |
| 6,205,530 B1 | * | 3/2001 | Kang .......................... 711/202 |
| 6,233,652 B1 | * | 5/2001 | Mathews et al. ............ 365/202 |

OTHER PUBLICATIONS

Operating Systems Support (Chapter 7), author unknown, date unknown, pp. 222–266.
Computer Architecture and Parallel Processing (Memory and Input–Output Systems), author unknown, date unknown, pp. 64–71.

* cited by examiner

Primary Examiner—Hiep T. Nguyen
(74) Attorney, Agent, or Firm—Fenwick & West LLP

(57) ABSTRACT

The current disclosure concerns dynamic variable page size translation of addresses. Such translation can be achieved at higher clock speeds than have heretofore been possible due to the use of a translation lookaside buffer (TLB) with RAM cells which eliminate the need to utilize circuitry external to the TLB. Such translation can also be bypassed at higher speeds than have heretofore been possible due to the use of translation bypass circuitry which eliminates the need to utilize circuitry external to the TLB.

20 Claims, 13 Drawing Sheets

Figure 3A

| SZ [2:0] | PAGE SIZE |
|---|---|
| 000 | 8 Kbytes |
| 001 | 64 Kbytes |
| 011 | 512 Kbytes |
| 111 | 4 Mbytes |

| V | SZ [0] | PA [13:15] | SZ [1] | PA [16:18] | SZ [2] | PA [19:21] | PA [22:46] | STATUS [8:0] |

| V | PA [46:22] | PA [21:19] | SZ [2] | PA [18:16] | SZ [1] | PA [15:13] | SZ [0] | STATUS [8:0] |

DYNAMIC VARIABLE PAGE SIZE TRANSLATION OF ADDRESSES

BACKGROUND

1. Field of the Invention

The present invention relates to the field of electronic memories and, more particularly, to dynamic variable page size translation of addresses. More specifically, the invention relates to translation look-aside buffers (TLB's) used in variable page size translation of memory addresses. Accordingly, the general objects of the invention are to provide novel methods, apparatus, data structures, etc. of such character.

2. Background of the Invention

Most modern data processing equipment relies on virtual memory to help manage the flow of data. Operating systems using such virtual memory map the user's view of the memory (the virtual address) to the actual physical location of data in the memory (the physical address). These mappings are either stored in the main memory or cached in buffers in the system. These buffers are called translation look-aside buffers and contain the mapping information necessary to translate virtual addresses into physical addresses.

Generally, memories are broken into separate blocks called pages and for a variety of reasons, these pages can vary greatly in size. Therefore, typical processors support multiple page sizes. The page size determines the number of bits in the virtual address that need to be translated because the offset for a given page can be derived from certain bits in the virtual address. For example, in the case of a 4 Kbyte page size, the 12 least significant (in terms of magnitude) bits of the virtual address (VA[12:0]) need not be translated. In the case of a 4 Mbyte page size, the 22 least significant bits (VA[21:0]) are not translated.

Typical translation look-aside buffers store size-field data in a page table entry array and (with the use of some peripheral circuitry) use this information to determine how many of the virtual address bits need to be translated and how many of the virtual address bits can be bypassed. These conventional TLB's utilize external control logic to decode the size-field data read from the TLB and additional bypass multiplexers to select either the virtual address bits or the physical address bits, depending on the situation for a particular address. Because such circuitry is synchronous, the additional control logic and multiplexers add significant delay in the critical path of the address data. This delay represents an undesirable obstacle to the implementation of higher clock-speed processors. Given the constant drive to create faster and faster processors, limits such as these pose a significant impediment to the achievement of higher clock speeds demanded by the next generation of processors. Conventional TLB's of this nature are described in more detail immediately below.

FIG. 1 is a diagram of a conventional variable page size TLB 100 shown in combination with the requisite peripheral circuitry. TLB 100 and the peripheral circuitry of FIG. 1, collectively, receive a virtual address VA[63:0] 101 and translate that address into a translated physical address TPA[40:0]. In particular, TLB 100 includes a content addressable memory (CAM) 102 and a page table entry array (RAM) 104. A representative page table entry 106 in RAM 104 stores a validity bit ("V") 108, size-field bits ("SZ[1:0]") 110, physical address bits ("PA[40:13]") 112 and status bits ("STATUS[8:0]") 114. As with the entirety of TLB 100, the function of the validity bit 108 and status bits 114 are well known in the art. Since these components, however, are less important to the operation of the invention, they need not be discussed in further detail herein. It will also be understood that the virtual addresses discussed herein have omitted various "content" bits which vary from system to system.

FIG. 1A is a table showing typical encoded size-field data for the four different page sizes supported by TLB 100 of FIG. 1. As shown in FIG. 1A, the size-field data consists of 2 bits, SZ[1:0], each different combination of these two bits representing a different page size. The data structure for the information stored in each page table entry is shown in FIG. 1B (see also page table entry 106 of FIG. 1). Those of ordinary skill will recognize the structure and function of data structure 130.

Referring back to FIG. 1, external size-field control logic 116 is coupled to the TLB 100. Further, external multiplexers 118, 120, and 122 are coupled to TLB 100, virtual address VA[63:0] 101 and size-field control logic 116. Among other things it will be appreciated that TLB 100 includes a plurality of page table entries 106' which are substantially identical in function and structure to entry 106. The operation of TLB 100 will now be illustrated in conjunction with the encoded size-field data shown in FIG. 1A.

With joint reference to FIGS. 1 and 1A, CAM 102 receives VA[63:0] 101, generates a CAM match signal 124 when the virtual address matches a virtual address tag in CAM 102 and sends match signal 124 to page table entry array 104. In response to CAM match signal 124, a corresponding page table entry of RAM 104 (taken to be entry 106 for purposes of illustration) is selected to output the stored physical address bits 112. Note that virtual address bits VA[12:0] of the translated physical address PA [40:0] are never translated because virtual address bits VA[12:0] (corresponding to the minimum page size 8 Kbytes) can always be used as the translated physical address bits TPA[12:0]. Similarly, physical address bits [40:22] are not fed into multiplexers 118, 120 and 122 but used directly as translated physical address bits TPA[40:22] (always translated), because these bits represent blocks of data larger than the maximum page size of 4 Mbytes.

Continuing the discussion above with respect to address bits which are not directly output, CAM match signal 124 identifies a page table entry which corresponds to the matched virtual address tag of CAM 102 and size-field control logic 116 receives the size-field data SZ[1:0] from that page table entry. The size-field control logic then decodes this data and generates select signals which control multiplexers 118, 120, and 122. If SZ[1:0] is "11" (representing a 4 Mbyte page size), then size-field control logic 116 generates select signals to select the virtual address bits VA[21:19], VA[18:16], and VA[15:13] in multiplexers 118, 120, and 122, respectively. This is because none of the physical address bits PA[21:19], PA[18:16] and PA[15:13] are necessary. If SZ[1:0] is "10" (representing a 512 Kbyte page size), then size-field control logic 116 generates select signals to select the physical address bits PA[21:19] in multiplexer 118 and virtual address bits VA[18:16] and VA[15:13] in the multiplexers 120 and 122, respectively. This is because the physical address bits PA[18:16] and PA[15:13] are not necessary. If SZ[1:0] is "01" (representing a 64 Kbyte page size), then size-field control logic 116 generates select signals to select the physical address bits PA[21:19] and PA[ 18:16] in multiplexers 118 and 120, respectively, and virtual address bits VA[15:13] in multiplexer 122. This is because the physical address bits PA[15:13] are not necessary. Finally, if SZ[1:0] is "00"

(representing a 8 Kbyte page size—the minimum page size), then size-field control logic 116 generates select signals to select the physical address bits PA[21:19], PA[18:16] and PA[15:13] in multiplexers 118, 120 and 122, respectively. In this case, all the physical address bits PA[21:19], PA[18:16] and PA[15:13] are necessary.

FIG. 1C is a diagram of a representative RAM cell 180 for storing a single bit of data (typically, but not necessarily, a physical address bit) and a sense amplifier 182 in conventional TLB 100. As shown, RAM cell 180 is a conventional latch that is capable of storing a single bit. When data is output from RAM cell 180, that data is amplified by sense amplifier 182 for compatibility with external multiplexers 118, 120 and 122 of FIG. 1. As is known in the art, all of the various RAM cells of the page table entry array (RAM 104) are identical to that of RAM cell 180. Thus, the values of "PA[i]" and "PA[i] bar" as shown in FIG. 1C should be understood as being replaced by "V" and "V bar"; "STATUS [i]" and "STATUS [i] bar"; and "SZ[i]" and "SZ[i] bar" depending on the location and purpose of this RAM cell.

Although conventional TLB 100 is capable of distinguishing different page sizes and outputting appropriate physical addresses by using the size-field control logic and multiplexers as described above, these components add significant and undesirable delay to the critical path of the address data. Also, translation of the virtual addresses commences after CAM 102 performs the CAM match. This also adds a significant and undesirable delay to the critical path of the address data. In total, because this system is synchronous it requires at least two clock cycles (i.e., four phases) to translate virtual address VA[63:0] 101 into a translated physical address TPA[40:0].

SUMMARY OF THE INVENTION

The above-described and other limitations and deficiencies of the related art are eliminated with the present invention by providing methods, apparatus, data structures, etc., which are capable of faster dynamic variable page size translation of addresses. In particular, the present invention enables faster translation by eliminating unnecessary circuitry otherwise present in the critical path of the address data. Furthermore, the invention enables faster bypass of such translation by eliminating unnecessary circuitry otherwise present in the critical path of the address data. With the advent of the present invention, translation of virtual address data can occur in as little as one clock cycle.

In one form, the present invention comprises a translation look-aside buffer for translating virtual addresses into physical addresses in a variable page size memory having N page sizes, where N is an integer greater than 1. This translation look-aside buffer receives virtual addresses and includes a CAM and a page table entry array. The CAM stores virtual address tags corresponding to the physical addresses. The page table entry array is coupled to the CAM, includes a plurality of page table entries, and stores physical address corresponding to the virtual address tags of the CAM. Each of the page table entries has at least a plurality of first-type memory cells grouped in N−1 cell groups and at least a plurality of N−1 second-type memory cells. Each of the second-type memory cells is coupled to a cell group and stores size-field data relating to the associated cell group. Responsive to appropriate signals, and depending on the size-field data, the TLB selects between the received virtual address bits and the stored physical address bits and outputs a translated physical address. In particular, the physical address bits stored in the first-type memory cells are output when the size-field data is in a first state. Conversely, the virtual address bits corresponding to the coupled cell group are output when the size-field data is in a second state.

In another form, each first-type memory cell has a physical address latch for storing a single physical address bit, dynamic read circuitry and a multiplexer coupled to the latch and read circuitry. The multiplexer receives a single virtual address bit and a single physical address bit stored in the latch. Responsive to a select-signal, the multiplexer outputs the physical address bit via the read circuitry when the size-field data is in the first state, but outputs the virtual address bit via the read circuitry when the size-field data is in the second state.

The present invention also includes novel RAM cells for a translation look-aside buffer of the type described above. These RAM cells each include a physical address latch for storing a physical address bit and a multiplexer coupled to the latch. The multiplexer receives a physical address bit from the latch and a virtual address bit. The multiplexer outputs the physical address bit when the size-field data is in a first state, but outputs the virtual address bit when the size-field data is in a second state.

Another form of the present invention includes methods of translating virtual addresses into physical addresses using a translation look-aside buffer of the type discussed above. These methods include reading a size-field associated with a group of physical address bits and selecting, as part of a translated physical address output from the TLB, physical address bits when the size-field is in a first state and selecting, as part of the output of the TLB, virtual address bits when the size-field is in a second state.

The present invention also enables methods of managing data in a translation look-aside buffer of the type discussed immediately above. Such methods entail (1) storing physical address data which is grouped into N−1 groups, where each bit-group comprises a plurality of physical address bits; and (2) storing N−1 size-field bits associated with respective bit-groups. In such methods, the physical address bits of the associated bit-group are output as part of a translated physical address when the associated size-field bits are stored in a first state, and the virtual address bits corresponding to the bit-group are output as part of the translated physical address when the associated size-field bits are stored in a second state.

One additional feature enabled by the present invention is a translation bypass function which bypasses the translation process and, therefore, passes the received virtual address as the address exiting the TLB. The translation bypass circuitry can accomplish this function in as little as one clock cycle and without the need for any peripheral circuitry.

Numerous other benefits and advantages of the present invention will become apparent to those of ordinary skill in the art from the detailed description of the invention, from the claims and from the accompanying drawings.

BRIEF DESCRIPTION OF THE DRAWINGS

The preferred embodiments of the present invention will be described below with reference to the accompanying drawings wherein like numerals represent like features throughout the several drawings and wherein:

FIG. 3A is a table showing the encoded size-field data for four different page sizes supported by the preferred TLB shown in FIG. 2;

FIG. 3B is a diagram of one preferred data structure for storing address data in the page table entry array of the TLB shown in FIG. 2;

FIG. 3C is a diagram of an alternative data structure for storing address data in the page table entry array of the TLB shown in FIG. 2;

DETAILED DESCRIPTION OF THE PREFERRED EMBODIMENTS

Figure 2:
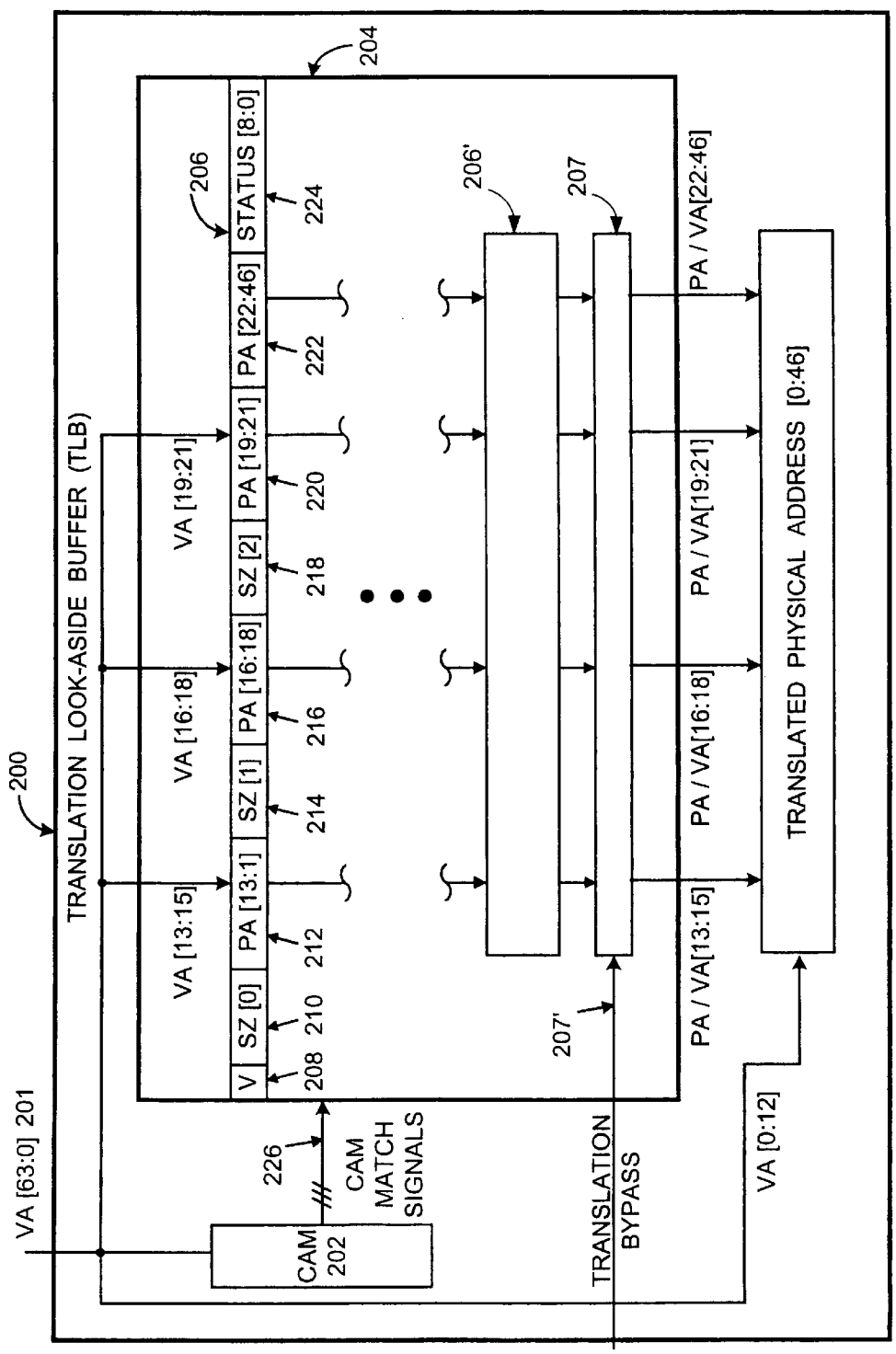
FIG. 2 is a variable page size TLB in accordance with one preferred embodiment of the present invention.

With reference to FIG. 2, there is shown a variable page size TLB 200 in accordance with one preferred embodiment of the present invention. As shown, TLB 200 includes a content addressable memory (CAM) 202 (shown in detail in FIGS. 8 and 9) and a representative page table entry array (RAM) 204 coupled to CAM 202. A representative page table entry (PTE) 206 in RAM 204 preferably stores a validity bit ("V") 208, a first size-field bit ("SZ[0]") 210, physical address bits ("PA[13:15]") 212 associated with SZ[0] 210, a second size-field bit ("SZ[1]") 214, physical address bits ("PA[16:18]") 216 associated with SZ[1] 214, a third size-field bit ("SZ[2]") 218, physical address bits ("PA[19:21]") 220 associated with SZ[2] 218, physical address bits ("PA[22:46]") 222 and status bits ("STATUS [8:0]") 224. The page table entry array 204 further may include a plurality of page table entries 206' that correspond to respective CAM virtual address tags and are substantially identical in function and structure to representative entry 206. However, PTE 206 has been selected as a representative entry for purposes of illustration.

Figure 1:
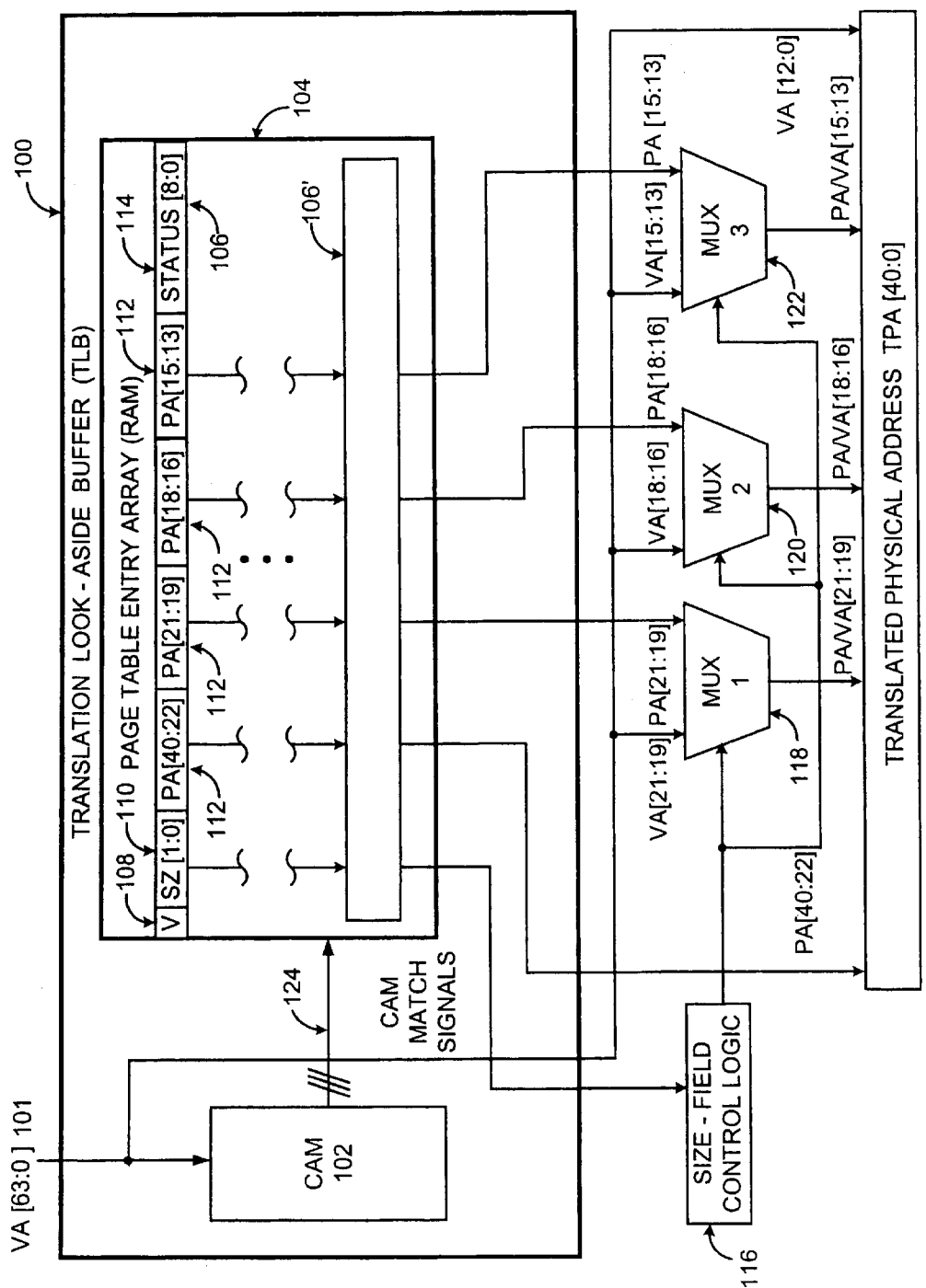
FIG. 1 is a conventional variable page size TLB described above.

As shown in FIG. 2, the least significant (in terms of magnitude) physical address bits may be stored in the left side of page table entry 206 to enhance the operating speed of the RAM 204. This is a direct result of the physical proximity of these lower bits to CAM 202 and, thus, the speed with which the CAM match signal can be received from CAM 202. It will be appreciated, however, that alternative configurations in accordance with the invention are possible even if these alternatives are less than optimal. One such arrangement is implemented in accordance with the data structure of FIG. 3C. It will also be appreciated that since validity bit 208 and status bits 224 are preferably conventional, the role of bits 208 and 224 need not be discussed in further detail herein. It will further be noted that, in contrast to TLB 100 of FIG. 1, TLB 200 is not coupled to any external multiplexer or to any size-field control logic. Restated, no peripheral circuitry is necessary for TLB 200 to translate virtual addresses into physical addresses.

Figure 1A:
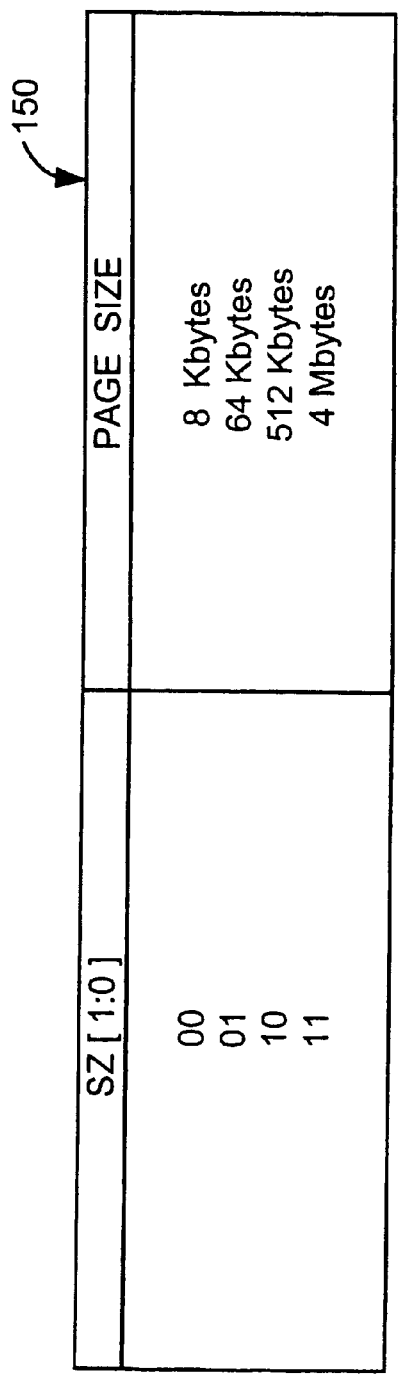
FIG. 1A is a table showing the encoded size-field data for four different page sizes supported by the conventional TLB shown in FIG. 1.
Figure 1B:
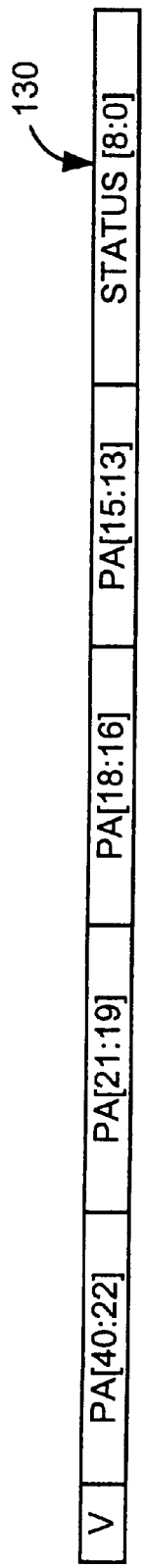
FIG. 1B is a diagram of the data structure for storing address data in the page table entry array of the TLB shown in FIG. 1.
Figure 1C:
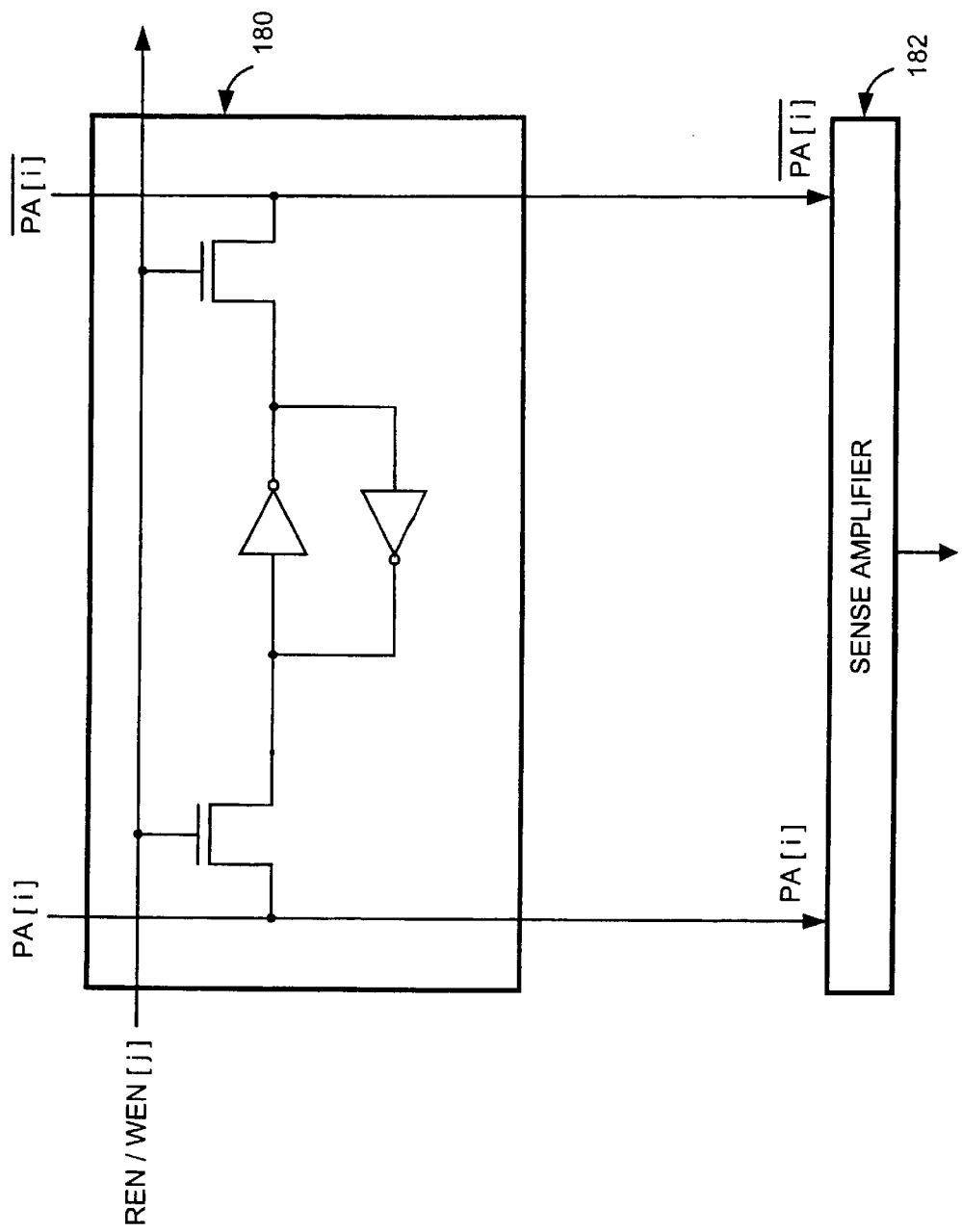
FIG. 1C is a representative RAM cell for storing a single bit of address data in the page table entry array of the TLB shown in FIG. 1.

FIG. 3A depicts a table 300 showing one system for encoding size-field data for the four different page sizes preferably supported by TLB 200 of FIG. 2. In contrast to the 2-bit encoding system embodied in the table of FIG. 1A, the page size data of FIG. 3A is represented by size-field data consisting of 3-bits. More generally, the present invention can support virtually any number of page sizes N by utilizing N–1 size bits (or cells) and associating therewith N–1 corresponding physical address bit (or cell) groups. Other encoding systems could also be utilized. For example, the data in size-bit column 301 of FIG. 3A could be inverted if the RAM cells of RAM 204 were changed to include inverting circuitry (relative to that disclosed herein) as would be known in the art based on the totality of the disclosure contained herein.

The preferred data structure for the page table entries of TLB 200 is shown as data structure 304 in FIG. 3B (see also entry 206 of FIG. 2). As shown therein, physical address bit-group PA[13:15] is associated with size-bit SZ[0]; bit-group PA[16:18] is associated with size-bit SZ[1]; and bit-group PA[19:21] is associated with size-bit SZ[2]. By contrast, bit-group PA[22:46] is always translated and, thus, need not be associated with any size-bit. Finally, STATUS [8:0] and "V" are of a conventional nature and, thus, are not necessarily associated with any size bit either.

An alternative data structure 302 for use in page table entry array 204 constitutes a rearrangement of data structure 304 and is shown in FIG. 3C. Aside from the aforementioned rearrangement and aside from reversing the order of the bits within the various bit-groups, alternative data structure 302 is equivalent to data structure 304. Accordingly, those of ordinary skill will understand how to modify TLB 200 for compatibility with alternative data structure 302 based on the totality of the disclosure contained herein.

The operation of TLB 200 will now be illustrated in conjunction with the preferred size-field data shown in FIG. 3A. Upon commencing translation, virtual address VA[63:0] 201 is simultaneously fed into CAM 202 and RAM 204 and a portion of the virtual address (VA[0:12]) is also delivered as a portion of the translated physical address. In particular, the virtual address bits VA[13:15], VA[16:18] and VA[19:21] are input (as noted above this occurs simultaneously with input of data 201 into CAM 202) into all of the RAM cells storing the corresponding physical address bits PA[13:15], PA[16:18] and PA[19:21]. Responsive to receipt of virtual address 201, CAM 202 generates a CAM match signal 226 indicating which, if any, of the virtual address tags in CAM 202 matches virtual address 201 and identifying a corresponding page table entry. While CAM 202 is performing this CAM match, at least some of the internal RAM cells of RAM 204 are precharged by presenting all of the page table entries with both virtual address data and stored physical address data.

Then CAM 202 sends the CAM match signal to RAM 204, which translates the necessary address bits for the page table entry referenced by the CAM match signal. Thus, during this next phase of the timing cycle, either the virtual address bits or physical address bits are selected for a given page table entry and this data exits TLB 200 as a portion of the translated physical address TPA[0:46].

As shown in FIG. 2, physical address bits PA[0:12] are preferably not stored in the page table entry (never translated), because the virtual address bits VA[0:12] can always be used as translated physical address bits TPA[0:12] at the output of TLB 200. Naturally, passing address bits VA[0:12] straight through TLB 200 in this manner has the desirable effect of reducing processing time and hardware. Conversely physical address bits [22:46] are always translated, because these bits represent blocks of data larger than the maximum page size of 4 Mbytes. Since this occurs consistently, however, processing time and hardware is minimized by always passing these bits to the output of TLB 200 as TPA[22:46] (except when a translation bypass occurs).

As noted above, the size-field data preferably consists of 3 bits, SZ[2:0], stored separately as SZ[0], SZ[1] and SZ[2] in representative page table entry 206 (see also data structure 304 of FIG. 3B). Each of these bits is associated with one respective group of physical address bits PA[13:15], PA[16:18] and PA[19:21] and each combination of these three bits represents a different page size. Since the size-field bits are associated with respective groups of physical address bits, each size bit functions as a flag to indicate whether substitution of a given virtual address bit group with the corresponding physical address bit group is necessary. For example, if SZ[0] is not set (e.g., "0"), then the physical address bits PA[13:15] are selected. If SZ[0] is set (e.g., "1"), then the virtual address bits VA[13:15] are selected. Similarly, if SZ[1] is not set (e.g., "0"), then the physical address bits PA[16:18] are selected, but if SZ[1] is set (e.g., "1"), then the virtual address bits VA[16:18] are selected. If SZ[2] is not set (e.g., "0"), then the physical address bits PA[19:21] are selected. If SZ[2] is set (e.g., "1"), then the virtual address bits VA[19:21] are selected. While each bit-group (for cell-group) associated with each size-field bit preferably contains three bits, the number of bits in each such group depends on the desired page sizes. In the preferred embodiment, three bit bit-groups correspond to page sizes of 8 kbytes, 64 kbytes, 512 kbytes and 4 Mbytes. Using four-bit bit-groups yields page sizes of 8 kbytes, 128 kbytes, 2 Mbytes and 32 Mbytes. Naturally, other numbers of bits for a given bit-group could also be used and these variations are within the scope of the present invention.

One particularly advantageous aspect of the invention is that since the page size data is incorporated directly into the page table entries as translation flags, there is no need for separate size-field control logic to decode the size-field data as in the prior art. This permits successful operation of a system in which one page table entry of array 204 is selected to output either precharged physical address bits or precharged virtual address bits based on the value of the size-field bits. Restated, by encoding the size-field data for different page sizes as shown in FIG. 3A, one can immediately output the appropriate precharged address bits from RAM 204 without peripheral circuitry (such as the size-field control logic and external multiplexers of the prior art) which add delay to the critical path. Several examples of circuitry for performing this inventive translation technique is described in detail below.

Figure 4:
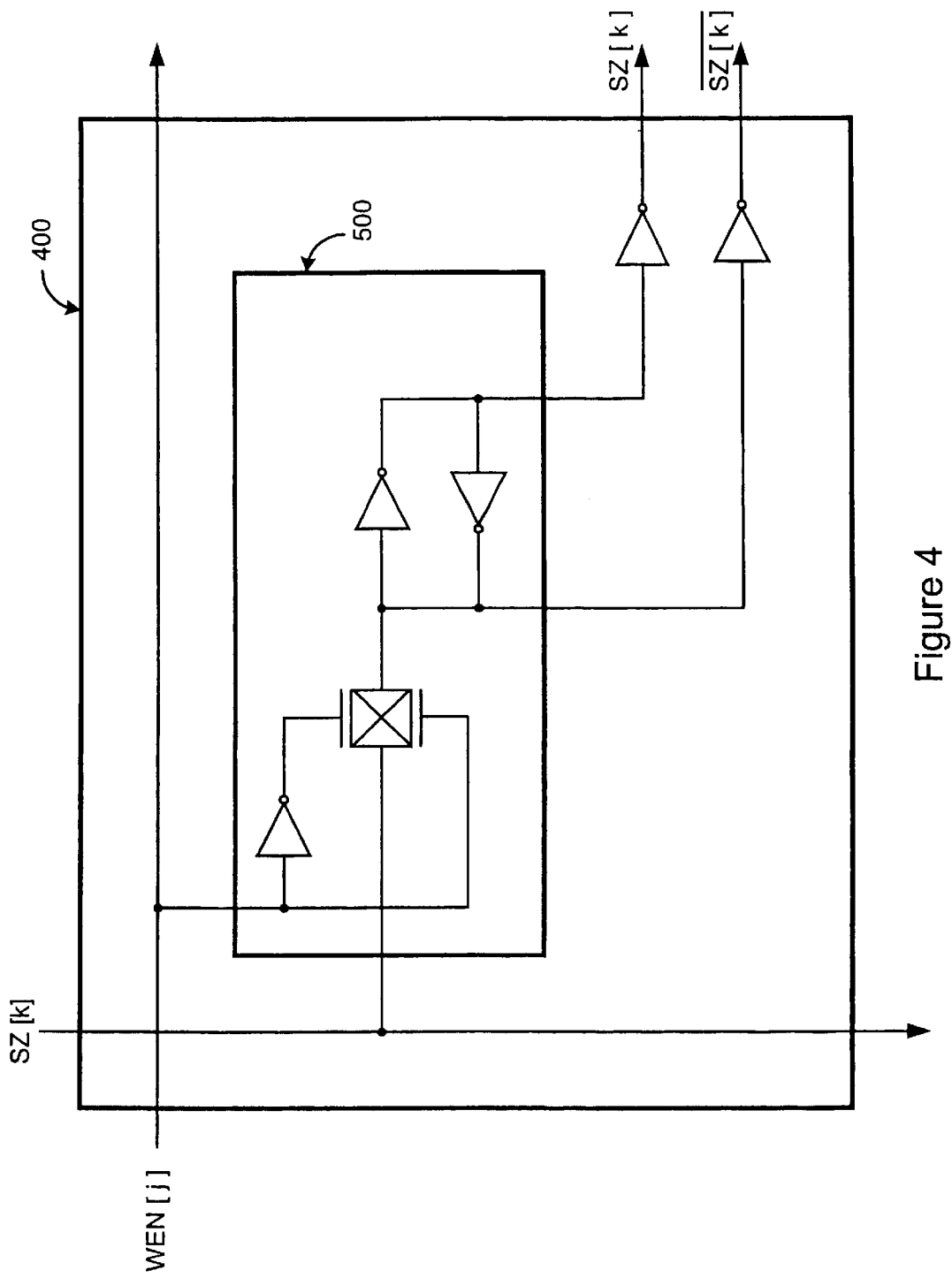
FIG. 4 is a RAM cell for storing the encoded size-field data in the page table entry array of preferred TLBs of the invention.
Figure 5A:
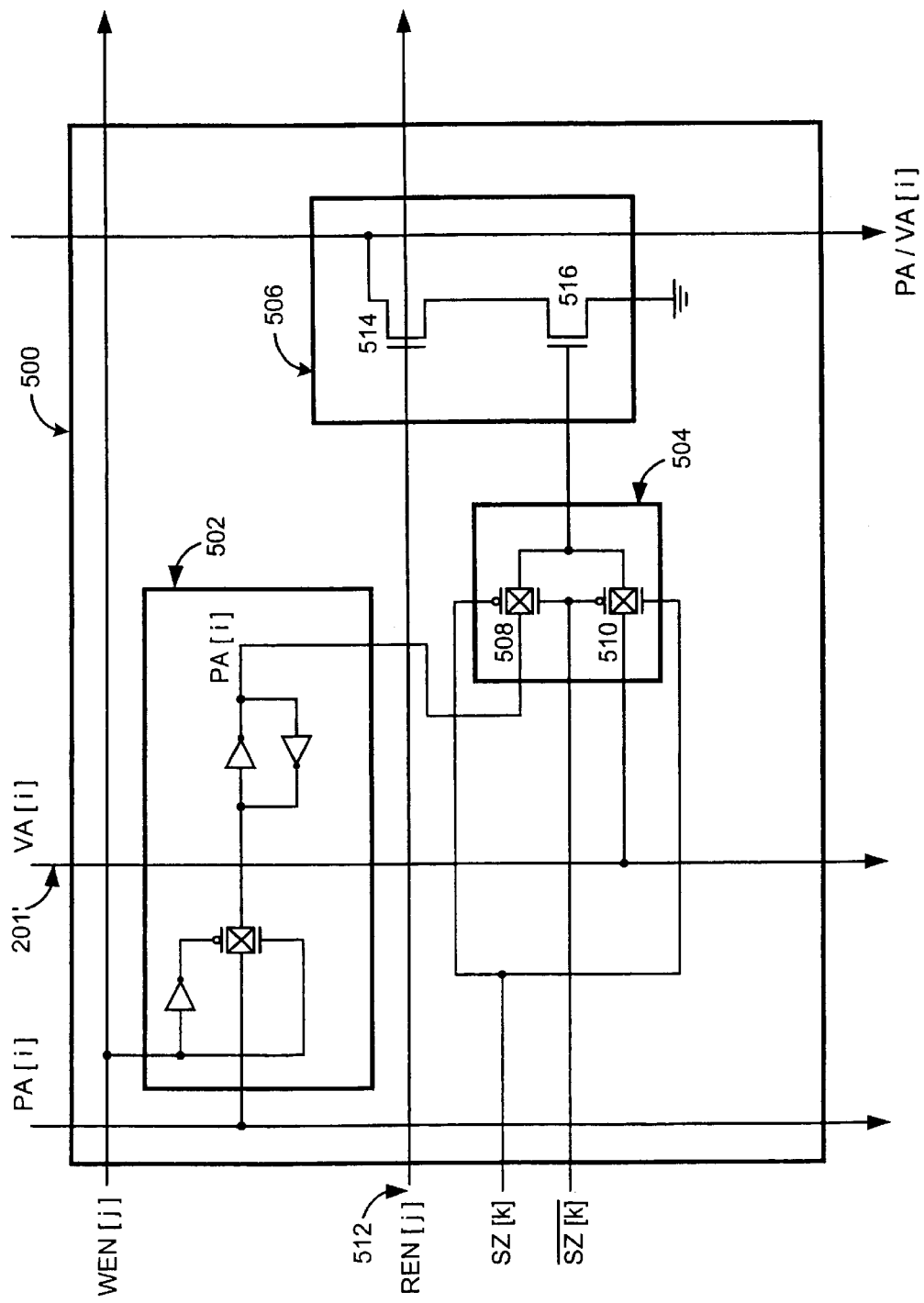
FIGS. 5A–5C are alternative RAM cells for storing physical address data in the page table entry array of preferred TLBs of the present invention.

FIG. 4 is a diagram of a preferred RAM cell 400 for storing encoded size-field data in a page table entry such as entry 206. As shown therein, RAM cell 400 is preferably a conventional latch 502 for receiving a single size-field bit "SZ[k]" and for outputting "SZ[k]" and its inverse "SZ[k] bar" to physical address RAM cells of the type shown in FIGS. 5A–5C. As shown in FIG. 5A (for example), "SZ[k]" and "SZ[k]bar" are provided to an associated physical address RAM cell which stores a representative physical address bit "PA[i]". Write-enable signal WEN[j] permits the storage of size-field data as is known in the art.

Looking more closely at FIG. 5A, there is shown a diagram of a preferred multiplexing RAM cell 500 for storing a single physical address bit and for outputting appropriate address data under the conditions described herein. As shown, RAM cell 500 preferably includes a latch 502 for storing a single physical address bit, dynamic read circuitry 506 and a multiplexer 504 coupled to both latch 502 and a signal path for receiving a corresponding virtual address bit VA[i] 201'. Prior receipt of a given virtual address, the stored value SZ[k] turns on and holds on one of transmission gate 508 or transmission gate 510 of the multiplexer 504 depending upon the value of SZ[k]. For example, if SZ[k] is set ("1"), then VA[i] 201' is preferably selected since transmission gate 510 of multiplexer 504 is held on. By contrast, if SZ[k] is not set ("0"), then PA[i] stored in physical address latch 202 is selected since transmission gate 508 is held on. When virtual address 201 to be translated is sent to CAM 202 for a CAM match, it is simultaneously sent to the page table entry array 204. An appropriate CAM match signal is then generated and sent to RAM 204 so that the stored data can be read from the particular entry referenced by the CAM match signal. While the CAM match signal is generated, dynamic read circuitry 506 is precharged. Once the relevant page table entry has been identified, the read enable signal REN[j] 512 (which is derived from the CAM match signal) for that single page table entry turns on transistor 514 of the dynamic read circuitry 506 to thereby output one of PA[i] or VA[i] as a translated bit PA/VA[i]. In this manner, and in contrast to the prior art, translation of the virtual addresses occurs during the phase immediately subsequent to the CAM match phase. This eliminates virtually all of the delay in the critical path resulting from the use of peripheral circuitry as in the related art. Thus, translation can be completed in a single timing cycle consisting of two phases. The write-enable signal WEN[i] permits the storage of a data bit as will be understood based on this disclosure.

Figure 5B:
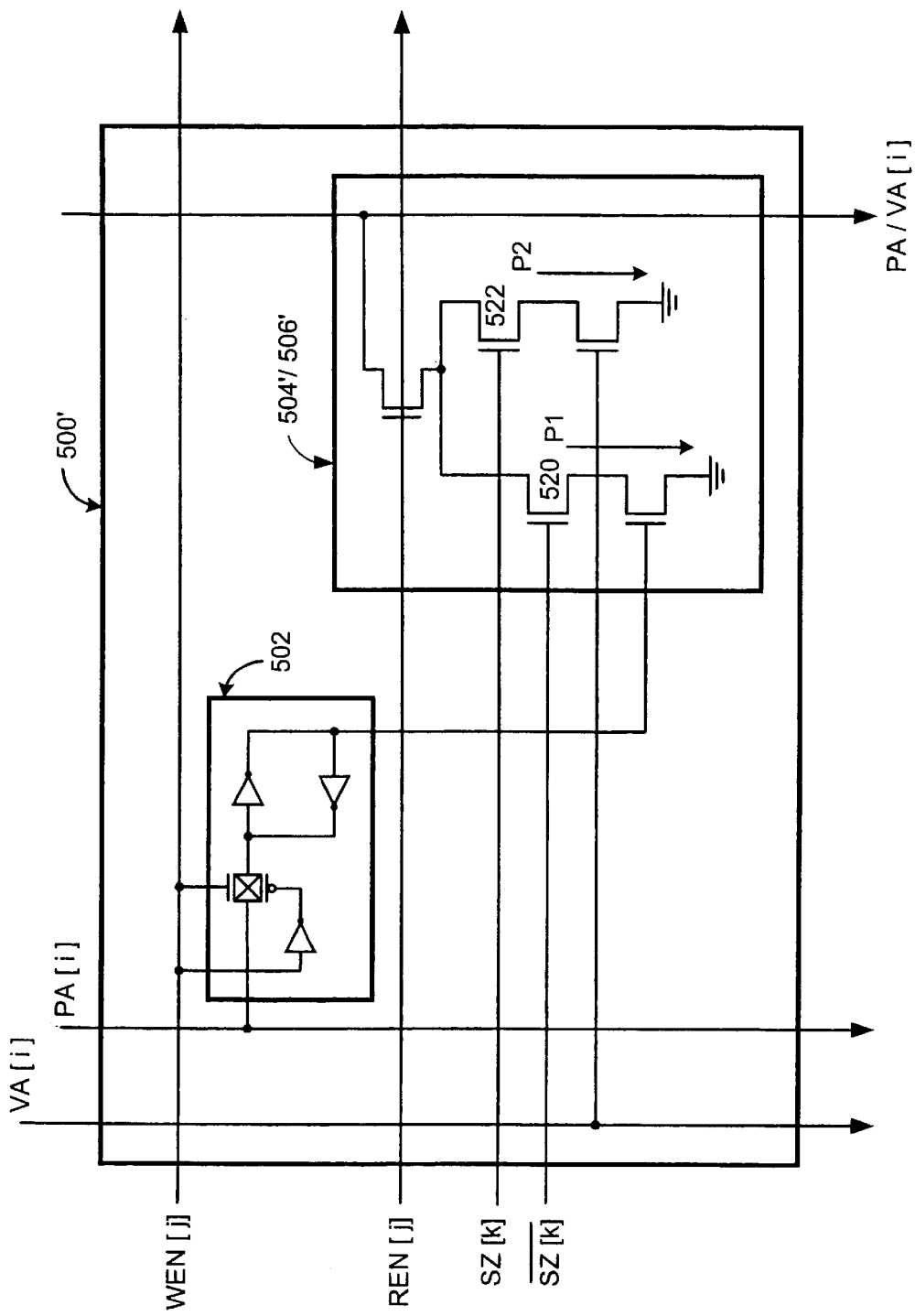

One alternative RAM cell 500' for storing a single physical address bit in TBL 200 is depicted in FIG. 5B. As shown therein, alternative RAM cell 500' preferably includes a latch 502 (as used in RAM cell 500) and a combined multiplexer/dynamic read circuitry 504'/506'. Although RAM cell 500' will perform the identical function as cell 500, it operates more slowly than cell 500. This decrease in speed is caused by the presence of transistors 520 and 522 being in the critical path of the signal. Additionally, a slight decrease in speed is also due to higher diffusion capacitance loading relative to cell 500, this extra capacitance arising from the presence of two paths (path P1 and path P2) to ground in the multiplexer/read circuitry. Since RAM cell 500' of FIG. 5B is functionally equivalent to RAM cell 500 of FIG. 5A, these cells may be interchanged within the embodiments disclosed herein.

Figure 5C:
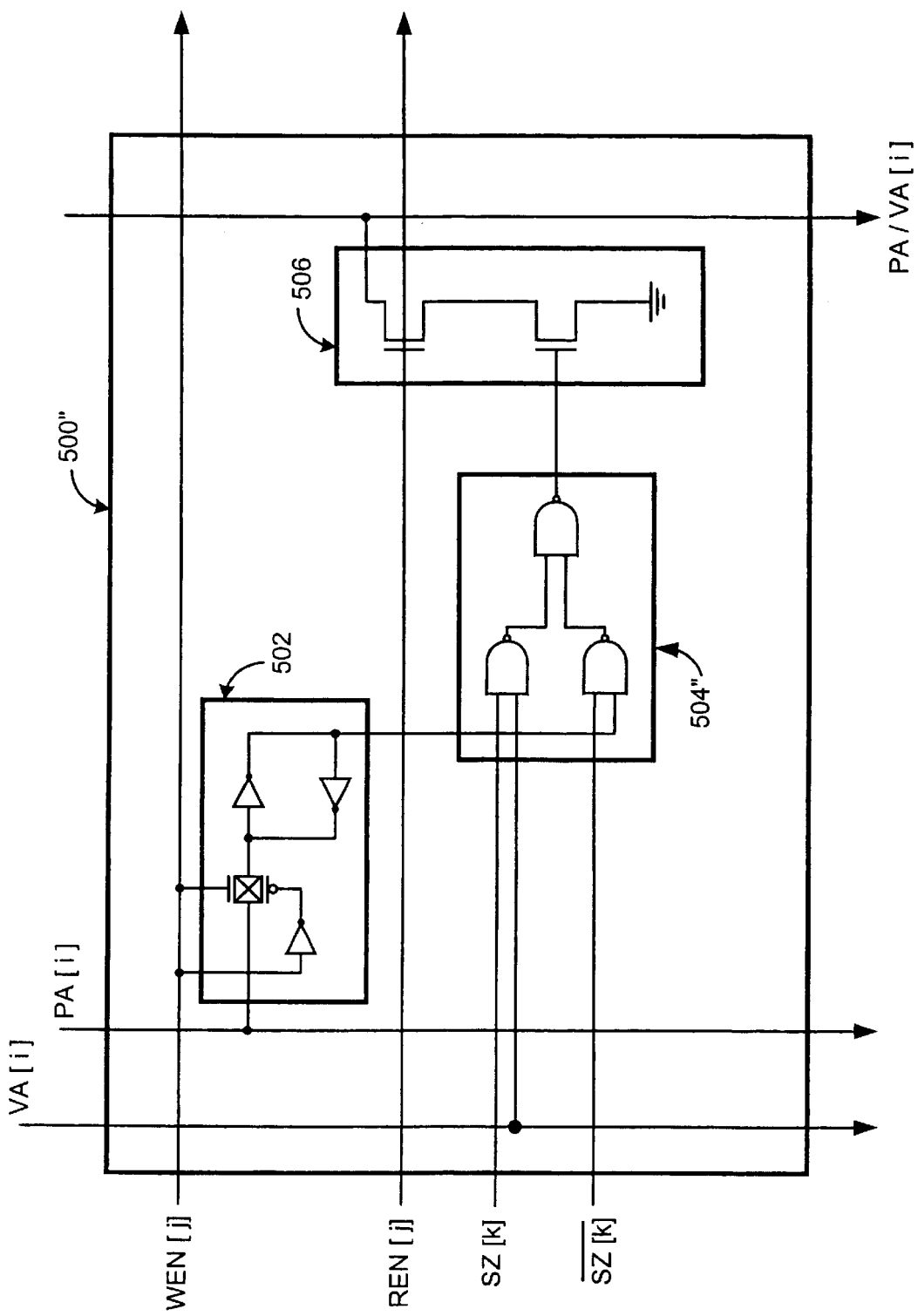

Another alternative RAM cell 500" for storing a physical address bit in TLB 200 is depicted in FIG. 5C. As shown therein, RAM cell 500" preferably includes a latch 502 (as used in RAM cell 500), dynamic read circuitry 506 (as used in RAM cell 500) and a multiplexer 504". Although RAM cell 500" will perform the identical function as cell 500, multiplexer 504" requires the use of at least 8 (eight) more transistors relative to multiplexer 504. It will be noted, however, that multiplexer 504" is not slower than multiplexer 504. Thus, RAM cell 500" is not slower than RAM cell 500. Since RAM cell 500" of FIG. 5C is functionally equivalent to RAM cell 500 of FIG. 5A, these cells may be interchanged within the embodiments disclosed herein. RAM cells 500' and 500" may also be substituted for one another as desired.

Figure 6:
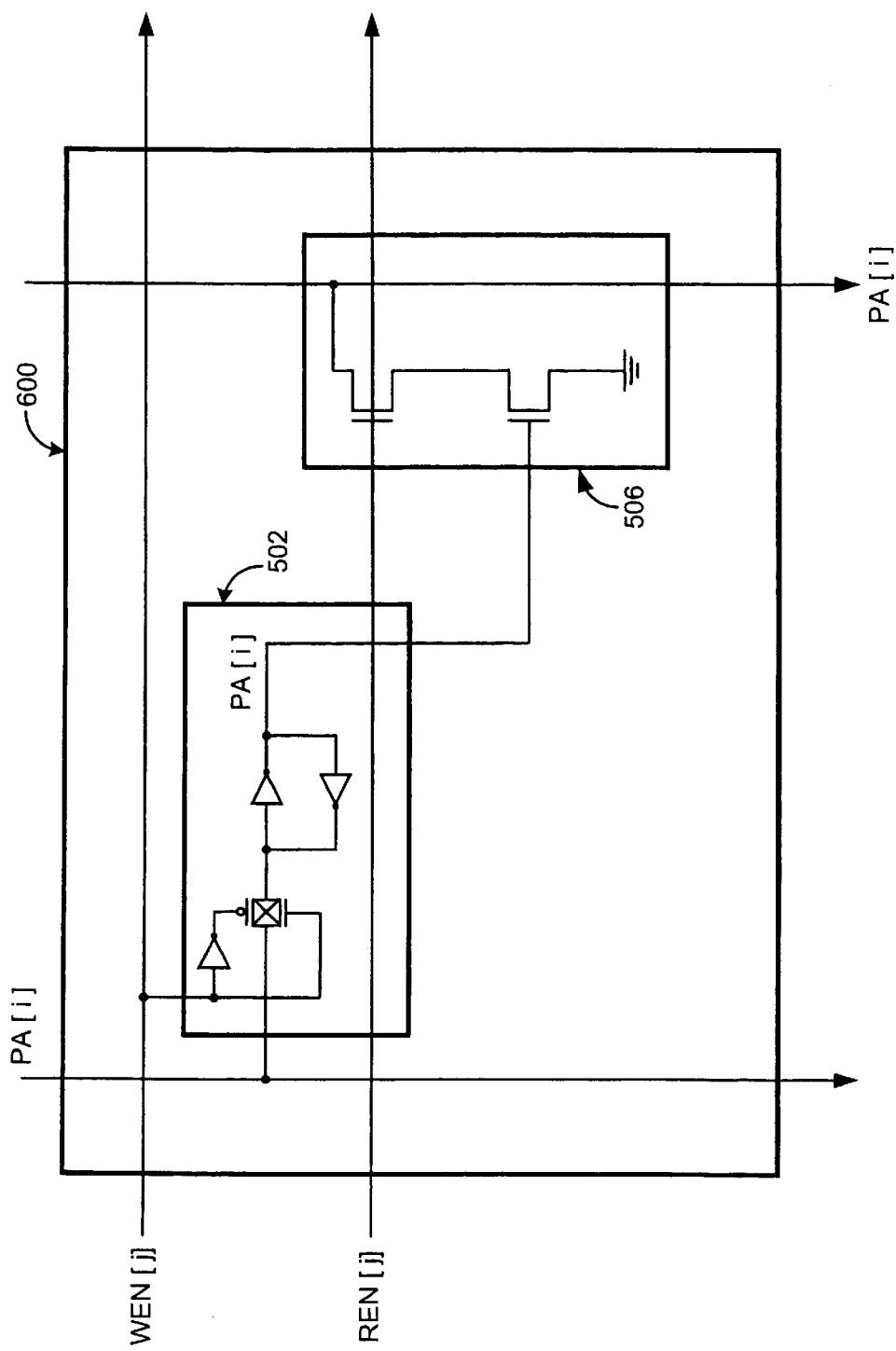
FIG. 6 is a RAM cell for storing selected data in the page table entry array of preferred TLBs of the invention.

A RAM cell 600 for storing the most significant (in terms of magnitude) physical address bits, for storing validity bits and for storing status bits is depicted in FIG. 6. As shown therein, each RAM cell 600 includes a latch 502 for storing one bit of data and dynamic read circuitry 506 for reading the data stored in latch 502 in response to an appropriate read signal REN[j]. As noted above, certain physical address bits are always output from TLB 200 because they correspond to bits above the maximum page size. Further, a number of conventional bits such as validity bits and status bits are and can be used in TLB 200. RAM cell 600 is ideally suited to these uses because no multiplexer functionality is needed for these cells. Write-enable signal WEN[j] permits the storage of such data as is known in the art.

Figure 7:
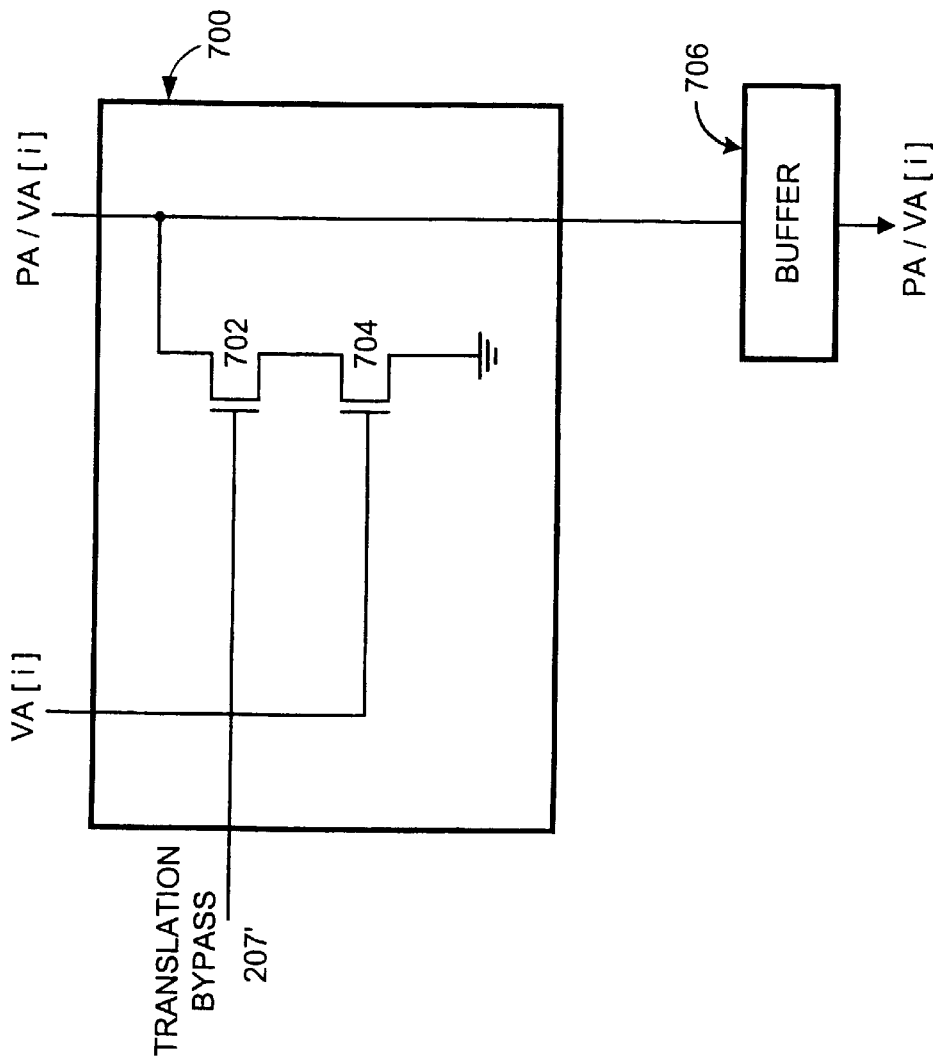
FIG. 7 is a preferred translation bypass circuit for bypassing a physical address bit in favor of a corresponding virtual address bit in response to receipt of a translation bypass signal.

With reference now to FIG. 7, there is shown a diagram of circuitry for completely bypassing a single physical address bit by sending a virtual address bit to the output of TLB 200 in response to a translation bypass signal. As explained above, virtual address bits VA[0:12] can always be used as the physical address bits. This means that VA[0:12] are preferably always passed straight through TLB 200 as TPA[0:12]. In a similar manner, bypass circuitry 700 permits the passage of a given virtual address bit VA[i] in response to a translation bypass signal regardless of any CAM match or translation operation. It will be appreciated that in TLB 200 bypass circuitry 700 is preferably duplicated for each physical address bit PA[i] of TLB 200. In the case of TLB 200 of FIG. 2, these repeated circuits are contained within and represented by bypass circuitry 207. As shown in FIG. 2, circuitry 207 is controlled by an external translation bypass signal fed to TLB 200 from conventional control logic (not shown) via enable signal line 207'.

The operation of bypass circuit 700 is explained in below. In response to a translation bypass signal, transistor 702 is enabled thereby blocking PA[i] and permitting VA[i] to pass through to a conventional buffer 706. Buffer 706 then amplifies VA[i] to ensure compatibility with any downstream circuitry and VA[i] exits TLB 200. Since bypass circuit 700 is duplicated for each physical address bit (see 207 of FIG. 2) the cumulative effect of all bypass circuits 700 is to pass virtual address VA[63:0] 201 to the output of TLB 200 without modification. This additional feature, which was unavailable in the prior art, is accomplished by the present invention with negligible cost in speed because transistor 298 adds negligible diffusion capacitance load to the line. Moreover, as with the other features of the invention, this bypass feature is accomplished without the need for additional circuitry or multiplexers external to TLB 200. Therefore, this function can also operate at the improved speed of TLB 200 as a whole.

Figure 8:
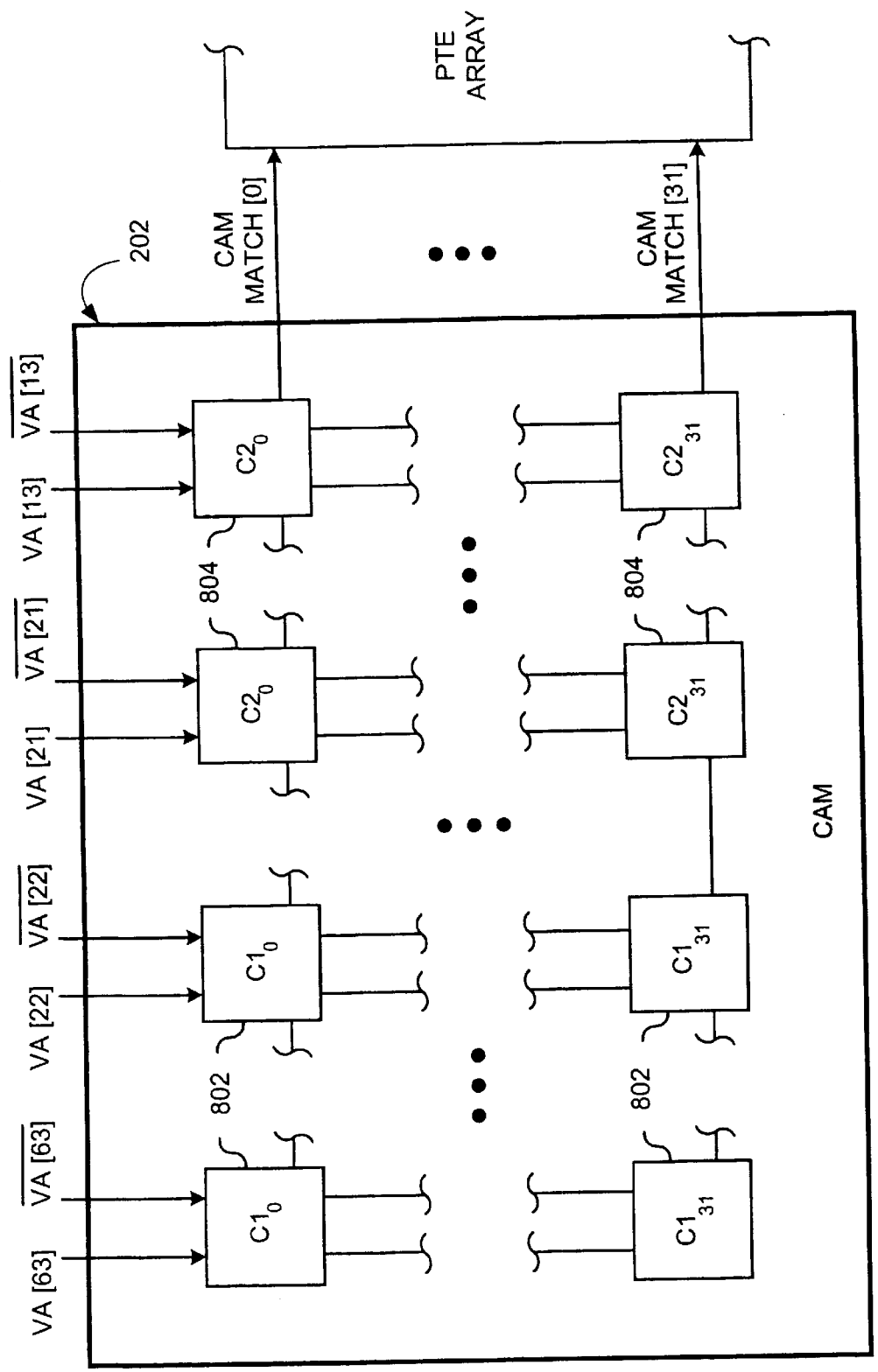
FIG. 8 is a preferred content addressable memory (CAM) in accordance with one preferred embodiment of the present invention, the CAM of FIG. 8 being used in the TLB shown in FIG. 2.

FIG. 8 is a diagram of CAM 202 in accordance with one preferred embodiment of the present invention. The general functionality of CAM 202 is conventional as was discussed above and, thus, it will be readily understood in depth by those of ordinary skill. In this regard, the CAM shown and described in U.S. Pat. No. 5,263,140 to Riordan issued on Nov. 16, 1993 could be used as CAM 202; this patent being hereby incorporated by reference into the current disclosure.

Another alternative CAM is shown and described in U.S. Pat. No. 5,319,590 to Montoye issued on Jun. 7, 1994; this patent also being hereby incorporated by reference into the current disclosure. However, the preferred content addressible memory 202 utilizes the CAM cell arrangements shown in FIGS. 9A and 9B due to the faster processing speeds that can be achieved with the CAM cells of FIGS. 9A and 9B.

Figures 9A, 9B:
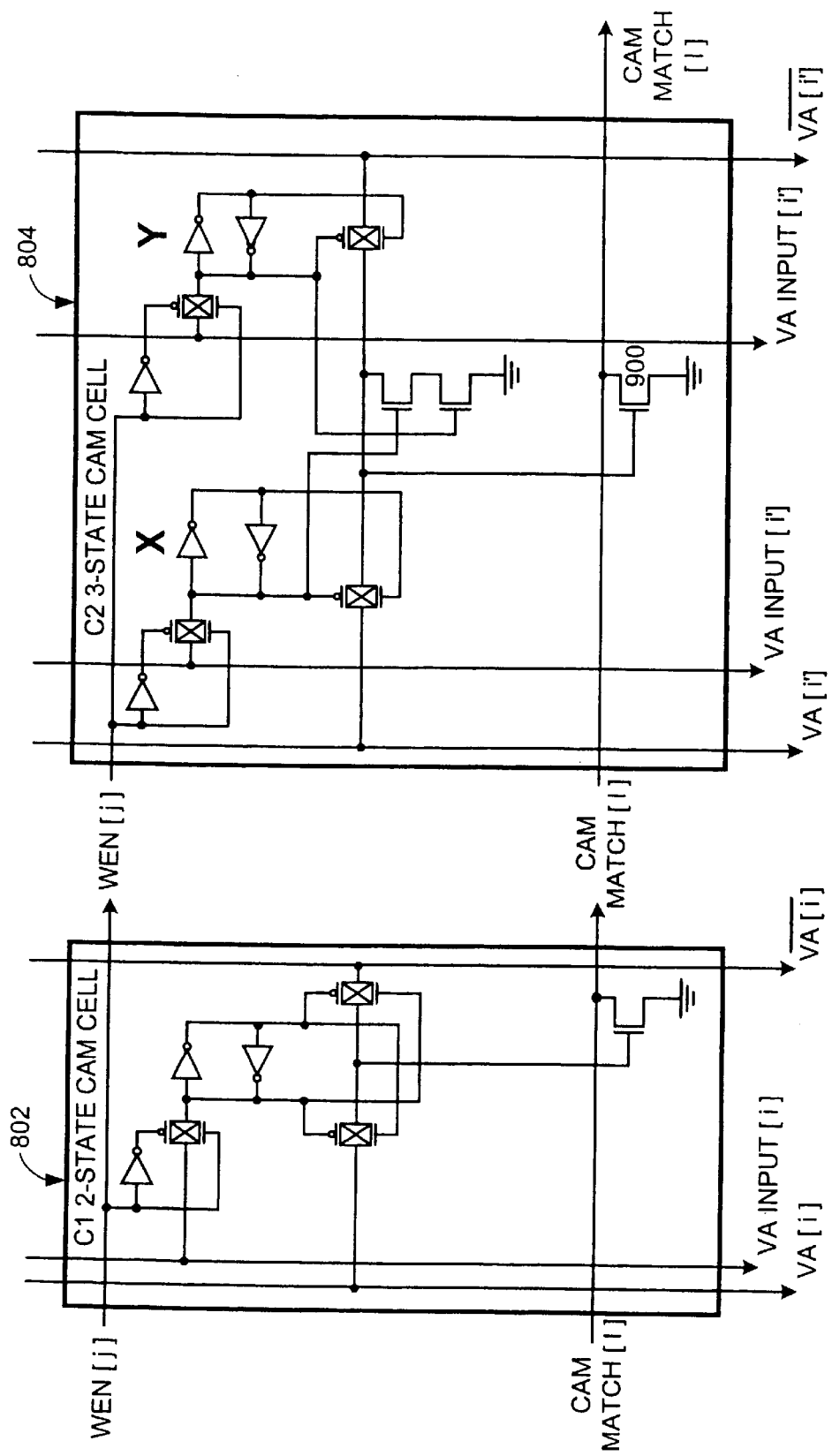
FIGS. 9A and 9B are diagrams of representative 2-state and 3-state CAM cells utilized in the CAM shown in FIG. 8.

With joint reference now to FIGS. 9A and 9B, there is shown therein diagrams of representative 2-state and 3-state CAM cells for use in CAM 202 (see cells C1 and C2, respectively). As shown in FIGS. 8 and 9A, CAM 202 preferably includes two-state CAM cells 802 (C1) for storing address tag bits and for matching virtual address bits VA [63:22] to the stored virtual address tags. Conventional 2-state CAM cells 802 are used in CAM locations which will always participate in the CAM match operation. In the preferred embodiment, these cells are used for address bits [63:22] because these bits are always matched for all page sizes supported (including the largest preferred page size of 4 Mbytes).

However, CAM 202 also preferably includes novel three-state CAM cells 804 (C2) for storing address tag bits which may or may not participate in the CAM match process. 3-state CAM cells 804 are used to enable optional participation of certain address bits in the match process. In particular, VA[21:19], VA[18:16] and VA[15:13] may or may not be matched, depending on the page size of the stored virtual address tag. In order to achieve this functionality, each of CAM cells 804 includes an X-bit latch and a Y-bit latch for encoding information. If a particular bit should be ignored during the match (e.g., because it is not needed for a particular page size), a value of "1" is stored in both latches of cell 804. If the bit is to be used and the virtual address tag has a value of "1", the X-bit latch stores a value of "1" and the Y-bit latch stores a value of "0". If the bit is to be used and the virtual address tag has a value of "0", the X-bit latch stores a value of "0" and the Y-bit latch stores a value of "1". The system does not permit both of the X-bit and Y-bit latches to store a value of "0". Taking a 64 kbyte page size as one example, bits [15:13] are not needed to perform a CAM match. Therefore, cell 804 for each of these CAM locations stores a value of "11" and only bits [63:16] participate in the effort to generate a match signal.

As shown in FIG. 9B, a single pull-down transistor 900 is configured to discharge the CAM match line as desired. Since the 4-state CAM cells of the related art rely on a pair of transistors for this purpose, the CAM cells of the related art are slower than CAM cell 804.

Naturally, CAM 202 strives to uniquely match incoming virtual addresses to an address tag stored in a given group of CAM cells 802 and, sometimes, 804. If a match is found, CAM 202 outputs a single CAM match signal to RAM 204 via one of CAM match lines [0] through [32] (see line 226 in FIG. 2). However, if no match occurs, the page table entry array generates a miss signal and the translated address must be retrieved from the main memory.

What is claimed is:

1. A translation look-aside buffer for translating received virtual addresses into physical addresses in a variable page size memory having N page sizes wherein N is an integer greater than 1, the translation look-aside buffer comprising:

a content addressable memory for storing virtual address tags and for matching the received virtual addresses to the address tags to thereby generate CAM match signals each referencing a page table entry; and plural page table entries coupled to the content addressable memory for targeted action based on the CAM match signal, each page table entry storing physical address data corresponding to respective virtual address data and comprising:
- a plurality of first-type memory cells grouped into N−1 cell groups, each first-type memory cell storing a single physical address bit; and
- N−1 second-type memory cells, each second-type memory cell coupled to a cell group and storing size-field data associated with the coupled cell group, the physical address data stored in the coupled cell group being output responsive to the size-field data is in a first state, and received virtual address bits corresponding to the coupled cell group being output responsive to the size-field data is in a second state.

2. The translation look-aside buffer of claim 1, wherein the content addressable memory generates a match signal responsive to a virtual address matching a virtual address tag and wherein each first-type memory cell comprises:
- a physical address latch for storing the single physical address bit; and
- a multiplexer coupled to the physical address latch and including at least a first and a second multiplexer input, a select-signal input, and a multiplexer output, the first multiplexer input receiving the physical address bit from the physical address latch, the second multiplexer input receiving a single bit of the virtual address, and the select-signal input receiving the size-field data from the associated second-type memory cell, the multiplexer outputting the single physical address bit responsive to the size-field data is in the first state, and the multiplexer outputting the single virtual address bit responsive to the size-field data is in the second state.

3. The translation look-aside buffer of claim 1, wherein each second-type memory cell comprises:
- a size-field data latch for storing the size-field data; and
- output circuitry directly coupled to a respective first-type memory cell for outputting the size-field data from the second-type memory cell directly into the coupled memory cell group.

4. The translation look-aside buffer of claim 1, wherein N equals 4.

5. A translation look-aside buffer for translating virtual addresses comprised of virtual address bits into physical addresses, the translation look-aside buffer comprising:
- a content addressable memory for storing virtual address tags corresponding to the virtual addresses; and
- a page table entry array coupled to the content addressable memory and receiving the virtual addresses, the page table entry array including a plurality of page table entries for storing physical addresses corresponding to respective ones of the virtual addresses tags, each page table entry comprising:
  - a physical address cell group, each physical address cell in the cell group storing a single physical address bit; and
  - a size-field memory cell coupled to the cell group and storing size-field data associated with the cell group, the page table entry array outputting the physical address bits stored in the cell group responsive to the size-field data is in a first state, and the page table entry array outputting the virtual address bits responsive to the size-field data is in a second state.

6. The translation look-aside buffer of claim 5, wherein each physical address cell comprises:
- a physical address latch storing the physical address bit; and
- a multiplexer coupled to the physical address latch, the multiplexer receiving the physical address bit from the physical address latch, the virtual address bit, and the size-field data from the size-field cell, the multiplexer outputting the physical address bit responsive to the size-field data is in the first state and outputting the virtual address bit responsive to the size-field data is in the second state.

7. The translation look-aside buffer of claim 6, wherein each size-field memory cell comprises:
- a size-field data latch storing the size-field data; and
- means for coupling the size-field data latch to the multiplexer of the physical address cell such that data from the size-field latch is directly fed into the multiplexer.

8. The translation look-aside buffer of claim 6, wherein each size-field memory cell comprises:
- a size-field data latch storing the size-field data; and
- means for directly coupling the data latch to the multiplexer of the physical address cell coupled thereto such that data from the size-field memory cell is directly fed into the multiplexer of the coupled physical address cell.

9. A method of using a translation look-aside buffer to translate received virtual address data into physical address data, the translation look-aside buffer comprising at least one page table entry having at least one two-state size-field cell with size-field data stored therein and at least one physical address cell group with physical address data stored therein and directly coupled to the size-field cell, the method comprising:
- receiving, at the page table entry, virtual address data corresponding to the physical address data stored in the cell group;
- reading the size-field data stored in the size-field cell;
- selecting, as an output from the page table entry and as part of the translated physical address data, the physical address data stored in the cell group responsive to the size-field cell is in a first state; and
- selecting, as an output from the page table entry and as part of the translated physical address data, the received virtual address data responsive to the size-field is in a second state.

10. The method of claim 9 further comprising: the page table entry bypassing the steps of selecting the physical address data and selecting the received virtual address data to thereby select the virtual address data in response to receipt of a translation bypass signal.

11. A translation look-aside buffer of a variable page size memory having a plurality of page sizes for translating received virtual address data into translated physical address data, the translation look-aside buffer comprising:
- a content addressable memory comprising a plurality of memory cells for storing virtual address tags corresponding to the received virtual address data, the content addressable memory generating a match signal referencing a page table entry which corresponds to one of the stored virtual address tags; and
- a page table entry array coupled to the content addressable memory and including a plurality of page table entries which each store physical address data, the array being capable of receiving a generated match signal and identifying a unique page table entry referenced by the match signal, each page table entry comprising:
  - a plurality of first-type memory cell groups, each cell group comprising a plurality of first-type memory cells and each first-type memory cell storing one physical address bit; and a plurality of second-type memory cells, each second-type memory cell coupled to a first-type cell group and storing size-field data associated with the coupled cell group, the physical address data stored in the coupled cell group being output responsive to the size-field data is in a first state, and the received virtual address data corresponding to the coupled cell group being output responsive to the size-field data is in a second state.

12. The translation look-aside buffer of claim 11, further comprising translation bypass circuitry for preventing selection of the physical address data in response to a translation bypass signal.

13. A memory cell for a translation look-aside buffer which receives virtual address data corresponding to physical address data, stores size field data indicative of the page size of a memory and generates a read signal, the memory cell comprising:

a physical address latch for storing a single physical address bit of the physical address;

a multiplexer coupled to the physical address latch, the multiplexer comprising at least a first and second multiplexer inputs, a select-signal input and a multiplexer output, the first input receiving the address bit from the physical address latch, the second input receiving a virtual address bit of the received virtual address data, and the select-signal input receiving the size-field data, the multiplexer outputting the physical address bit responsive to the size-field data is in a first state and outputting the virtual address bit responsive to the size-field data is in a second state; and dynamic read circuitry coupled to the multiplexer for outputting from the memory cell the multiplexer output in response to the read signal.

14. A dynamic variable page size translation look-aside buffer for translating virtual addresses into physical addresses in a variable page size memory having a plurality of page sizes, the translation look-aside buffer comprising:

means for storing virtual address tags which correlate the virtual addresses to the physical addresses; and means for storing page table entries coupled to the means for storing virtual address tags, each page table entry corresponding to one of the virtual address tags and storing a physical address, each page table entry comprising:

a plurality of physical address memory cell groups, each cell group including at least one cell and storing physical address data;

a plurality size-field memory cells coupled to respective ones of the physical address cell groups and storing size-field data for respective ones of the cell groups;

means for outputting the physical address data of a particular cell group when the data stored in the size-field cell which is coupled to the particular cell group is in a first state;

means for outputting virtual address data corresponding to the physical address data of a particular cell group when data stored in the size-field cell which is coupled to the particular cell group is in a second state.

15. The translation look-aside buffer of claim 14, wherein the means for storing virtual address tags generates a match signal responsive to a virtual address matching one of the virtual address tags; and each physical address memory cell comprises:

a physical address storing means for storing a physical address bit;

multiplexer means for receiving (a) the physical address bit from the physical address storing means, (b) a virtual address bit, and (c) the size-field data from the coupled size-field memory cell and for outputting the physical address bit responsive to the size-field data is in the first state and the virtual address bit responsive to the size-field data is in the second state; and dynamic read means coupled to the multiplexer means and the means for storing virtual address tags, the read means outputting the output of the multiplexer means in response to a match signal from the means for storing the virtual address tags.

16. The translation look-aside buffer of claim 14, wherein each size-field memory cell comprises:

size-field storing means for storing size-field data; and means for outputting the size-field data directly into the coupled cell group.

17. A method of managing data in a translation look-aside buffer of a variable page size memory using virtual addresses corresponding to physical addresses, the virtual memory having N page sizes wherein N is an integer greater than 1 and each of the virtual addresses comprising a plurality of virtual address bits, the method comprising:

storing physical address data, the physical address data grouped into N−1 groups and each group comprising a plurality of physical address bits;

storing N−1 size-field data coupled to the respective N−1 groups, each of the size-field data being stored in a first state when the physical address bits in the coupled group will be used to generate the physical address and the size-field data being stored in a second state when the virtual address bits corresponding to the coupled group will be used to generate the physical address;

responsive to a data request which includes the virtual address, outputting a translated physical address that corresponds to the virtual address, comprising:

outputting the physical address bits stored in the coupled cell group responsive to the size-field is in the first state; and outputting the virtual address bits corresponding to the coupled cell group responsive to the size-field is in the second state.

18. A method of managing data in a translation look-aside buffer of a variable page size virtual memory using virtual addresses corresponding to physical addresses, the virtual memory having N page sizes wherein N is an integer greater than 1 and each of the virtual addresses comprising a plurality of virtual address bits, the method comprising:

storing physical address data, the physical address data grouped into N−1 groups and each group comprising a plurality of physical address bits; and storing N−1 size-field data coupled to the respective N−1 groups, each of the size-field data being stored in a first state when the physical address bits in the coupled group will be used to generate the physical address and the size-field data being stored in a second state when the virtual address bits corresponding to the coupled group will be used to generate the physical address.

19. A method of using a translation look-aside buffer to translate received virtual addresses into translated physical addresses during a single two-phase timing cycle, the translation look-aside buffer comprising a content addressable memory and a page table entry array with a plurality of page table entries coupled to the content addressable memory, each page table entry comprising at least one physical address cell group for storing physical address data potentially corresponding to a received virtual address, each page table entry further comprising at least one two-state size-field cell coupled to the cell group, the method comprising:

during the first phase of the timing cycle:
receiving a virtual address at both the content addressable memory and the page table entry array;
using the content addressable memory to convert the received virtual address into a match signal which references one of the page table entries in the array; and
using the virtual address to precharge the physical address cell group of at least one page table entry; and during the second phase of the timing cycle:
receiving the match signal at the page table entry array;
outputting, as a portion of the translated physical address, the physical address data from the cell group of the page table entry referenced by the match signal responsive to the coupled size-field cell is in a first state; and outputting, as a portion of the translated physical address, the received virtual address data corresponding to the physical address data stored in the cell group of the page table entry referenced by the match signal responsive to the size-field cell is in a second state.

20. The method of claim 19 wherein each physical address cell of each cell group comprises a latch for storing a single physical address bit and a multiplexer coupled to the latch;

the step of outputting the physical address data further comprises receiving the physical address bit and a single bit of the virtual address and selecting as the cell output the physical address bit responsive to the size-field cell being in the first state; and the step of outputting the physical address data further comprises receiving the physical address bit and a single bit of the virtual address selecting the virtual address bit as the cell output responsive to the size-field cell being in the second state.

* * * * *